(12) United States Patent
Tu

(10) Patent No.: US 10,148,116 B2
(45) Date of Patent: Dec. 4, 2018

(54) WIRELESS CHARGING CIRCUIT

(71) Applicants: INVENTEC APPLIANCES (PUDONG) CORPORATION, Shanghai (CN); INVENTEC APPLIANCES CORP., New Taipei (TW)

(72) Inventor: Shu-Yang Tu, New Taipei (TW)

(73) Assignees: INVENTEC APPLIANCES (PUDONG) CORPORATION, Shanghai (CN); INVENTEC APPLIANCES CORP., New Taipei ( * ) Notice: Subject to any disclaimer, the term of this patent is extended or adjusted under 35 U.S.C. 154(b) by 134 days.

(21) Appl. No.: 15/071,796

(22) Filed: Mar. 16, 2016

(65) Prior Publication Data
US 2016/0294208 A1 Oct. 6, 2016

(30) Foreign Application Priority Data
Mar. 30, 2015 (CN) .......................... 2015 1 0144339

(51) Int. Cl.
*H02J 7/00* (2006.01)
*H02J 7/02* (2016.01)
*H02J 50/10* (2016.01)

(52) U.S. Cl.
CPC .............. *H02J 7/025* (2013.01); *H02J 50/10* (2016.02)

(58) Field of Classification Search
USPC .................................................. 320/107–115
See application file for complete search history.

(56) References Cited

U.S. PATENT DOCUMENTS

| | | | |
|---|---|---|---|
| 2011/0050164 A1* | 3/2011 | Partovi | H01F 5/003 320/108 |
| 2011/0115429 A1* | 5/2011 | Toivola | H01F 38/14 320/108 |
| 2013/0169222 A1* | 7/2013 | Yoon | H02J 7/0042 320/108 |

\* cited by examiner

*Primary Examiner* — Binh Tat
(74) *Attorney, Agent, or Firm* — Muncy, Geissler, Olds & Lowe, P.C.

(57) ABSTRACT

A wireless charging circuit includes a substrate. The first surface of the substrate includes a first metal wire, which is spirally disposed on the first surface. A second metal wire is disposed on the second surface of the substrate. An end of the second metal wire is electrically connected to an end of the first metal wire. The second metal wire further has a first extending portion on the second surface; wherein the first extending portion is corresponding to the first metal wire and the length of the first extending portion is smaller than a half of that of the first metal wire.

13 Claims, 6 Drawing Sheets

WIRELESS CHARGING CIRCUIT

CROSS-REFERENCES TO RELATED APPLICATIONS

The application claims priority to China Patent Application No. 201510144339.3, filed on Mar. 30, 2015, the content of which are hereby incorporated by reference in their entirety.

FIELD OF THE INVENTION

The present invention relates to a wireless charging circuit, and more particularly to a coupling coil of the wireless charging circuit.

BACKGROUND OF THE INVENTION

Nowadays, the mainstream wireless charging products in the market uses the coiled metal wire to transfer the energy. Most of the products reach the specific operation frequency by adjusting the coil size or the coiling number of the metal wire coil. As shown in FIG. 1, the wireless charging system 9 includes a coupling coil 91 and a matching circuit 92. The coupling coil 91 provides inductance (L), and the matching circuit 92 provides capacitor (C) to form a LC series resonance to increase the coupling energy efficiency. In addition to provide the desired electric capacity for resonance, the matching circuit 92 also has an impedance conversion function. The inductance and capacitance value are both important parameters to control the operation frequency.

Generally, the matching circuit 92 utilizes the lump-element, such as the ceramic capacitor. The lump-element includes series capacitor (C1) and parallel capacitor (C2). But the lump-element has inherent limitations in the usage of matching circuit 92. For example, the capacitance value of every single lump-element is fixed, and the adjustable capacitance values are not continuously between each other. Thus, there are no suitable capacitance values that can be fitted so as to the wireless charging system 9 is unable to achieve the best design. Although users can utilizes a number of capacitors in parallel to increase the design flexibility, but the increase of the capacitance also increases of the occupancy area, the design time and the production cost of the matching circuit 92. With smaller and smaller capacitance value, the percentage error caused by the lump-elements will get bigger and bigger. Therefore, the present invention is considered necessary to provide a new wireless charging circuit to improve the above problems.

SUMMARY OF THE INVENTION

According to aforementioned drawbacks, an objective of the present invention is to provide a wireless charging circuit to replace the conventional coupling coil. With the structure of the metal wires overlapped to each other, the wireless charging circuit has an equivalent parallel capacitance value, and the parallel capacitance value of the wireless charging circuits is adjusted by changing the length of the metal wires.

The present invention provides a wireless charging circuit which includes a substrate, a first metal wire and a second metal wire. The substrate includes a first surface and a second surface which is opposite to the first surface. The first metal wire is spirally disposed on the first surface and includes a first end. The second metal wire is disposed on the second surface and the second metal wire includes a second end and a first extending portion, in which the second end is electrically connected to the first end, and the first extending portion corresponds to the first metal wire.

In another aspect of the present invention, the present invention also provides a wireless charging circuit which includes a substrate, a first metal wire, and a second metal wire. The substrate includes a first surface and a second surface which is opposite to the first surface. The first metal wire is spirally disposed on the first surface and the first metal wire also includes a first end. The second metal wire is disposed on the second surface and the second metal wire includes a second end and a first extending portion, in which the second end is electrically connected to the first end, and the arrangement of the first extending portion partially overlaps with the first metal wire.

The present invention provides another aspect of a wireless charging circuit, which includes a substrate, a first metal wire, and a second metal wire. The substrate includes a first through hole, a second through hole, a first surface and a second surface which is opposite to the first surface. The first metal wire is spirally disposed on the first surface and the first metal wire includes a first end. The second metal wire is disposed on the second surface, and the second metal wire includes a second end and a first extending portion, in which the second end of the second metal wire is electrically connected to the first end of the first metal wire through the first through hole; the first extending portion of the second metal wire extends to the first surface through the second through hole, and the first extending portion does not contact with the first metal wire.

BRIEF DESCRIPTION OF THE DRAWINGS

The present invention will be apparent to those skilled in the art by reading the following description of a preferred embodiment thereof with reference to the drawings, in which.

DETAILED DESCRIPTION OF THE PREFERRED EMBODIMENT

The present invention relates to a wireless charging circuit, in which the operation of the coil wireless charging circuit and other electrical connection are not important issue of the present invention. Thus, in the following detailed description of the preferred embodiments, the reference is made to the accompanying drawings which form a part hereof, and as shown by way of illustration specific embodiments in which the invention may be practiced. As such, the directional terminology is used for purposes of illustration and is in no way limiting the present invention.

Figure 2:
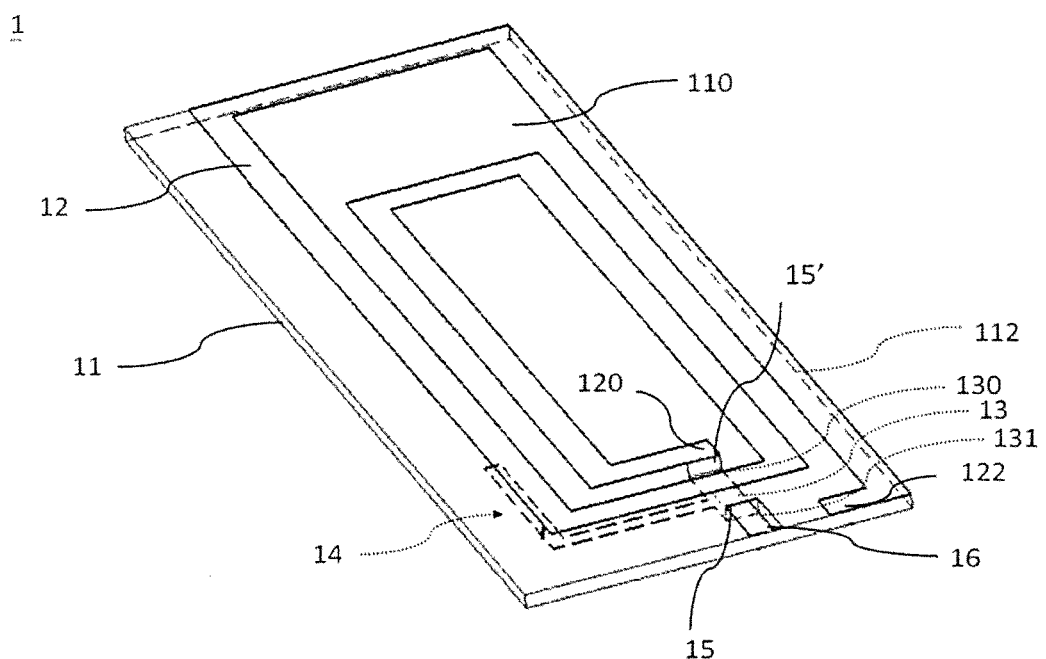
FIG. 2 is a top plane view of the wireless charging circuit of the first embodiment of the present invention.

Please refer to FIG. 2. FIG. 2 is a top plane view of the wireless charging circuit of the first embodiment of the present invention. As shown in FIG. 2, the wireless charging circuit 1 comprises a substrate 11, and the substrate 11 includes a first surface 110 and a second surface 112 which is opposite to the first surface 110. The substrate 11 further includes a plurality of first through holes 15 which is passed from the first surface 110 to the second surface 112. A first metal wire 12 is spirally disposed on the first surface 110. The spiral formed by the first metal wire 12 has an inner end 120 and an outer end 122. A second metal wire 12 is disposed on the second surface 112 of the substrate 11, and a first end 130 of the second metal wire 13 is electrically connected with the inner end 120 of the first metal wire 12 through a second through hole 15'. In addition, the second metal wire 13 comprises a first extending portion 14 on the second surface 112 and the arrangement of the first extending portion 14 is corresponding to the first metal wire 12 on the first surface 110. In the present embodiment, the first extending portion 14 and the first metal wire 12 are partially paralleled to each other. That is, by viewing from the top plane view of the first surface 110 of the substrate 11, the first extending portion 14 is fully overlapped with the first metal wire 12. Further, the substrate 11 includes a second extending portion 16 of the second metal wire 13 on the first surface 110, and the second extending portion 16 is extended from a second end 131 of the second metal wire 13. The second extending portion 16 and the first metal wire 12 are not interleaved. In this embodiment, the length of the first extending portion 14 is shorter than a half of that of the first metal wire 12, and the distance between the first extending portion 14 and the first metal wire 12 which is corresponding to the first extending portion 14 is not more than 5 mm.

Figure 3:
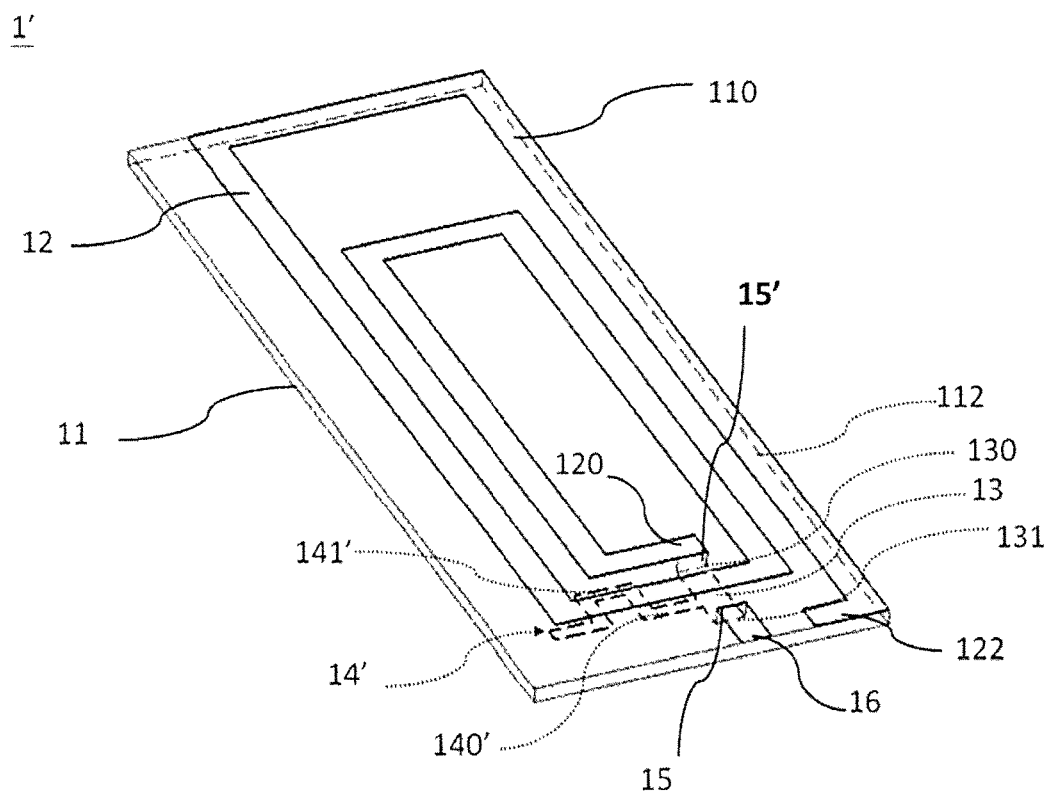
FIG. 3 is a top plane view of the wireless charging circuit of the second embodiment of the present invention.

Please refer to FIG. 3. FIG. 3 is a top plane view of the wireless charging circuit of the second embodiment of the present invention. As shown in FIG. 3, the structure of wireless charging circuit 1' is similar to that of the wireless charging circuit 1. The wireless charging circuit 1' also includes a substrate 11, a first metal wire 12, a second metal wire 13 and a second extending portion 16 of the second metal wire 13. The major difference between the wireless charging circuit 1 and the wireless charging circuit 1' is that the first extending portion 14' of the second metal wire 13 on the second surface 112 of the substrate 11 is partially corresponding to the first metal wire 12 on the first surface 110 of the substrate 11. In this embodiment, the first extending portion 14 is spirally disposed on the second surface 112 of the substrate 11. Specifically, the first extending portion 14' with a circuitous structure is formed by the metal wire section 140' and the metal wire section 140'. The metal wire section 140' disposed on the second surface is corresponding to the first metal wire 12 disposed on the first surface 110, and the metal wire section 141' disposed on the second surface 112 is not corresponding to the first metal wire 12. That is, by viewing from the top plane view of the first surface 110 of the substrate 11, the first extending portion 14' is partially overlapped with the first metal wire 12, and specifically, the metal wire section 140' and the first metal wire 12 are overlapped. In this embodiment, the length of first extending portion 14' is shorter than a half of that of the first metal wire 12, and the distance between the first extending portion 14' and the first metal wire 12 which is corresponding to the first extending portion 14' is not more than 5 mm.

Figure 4:
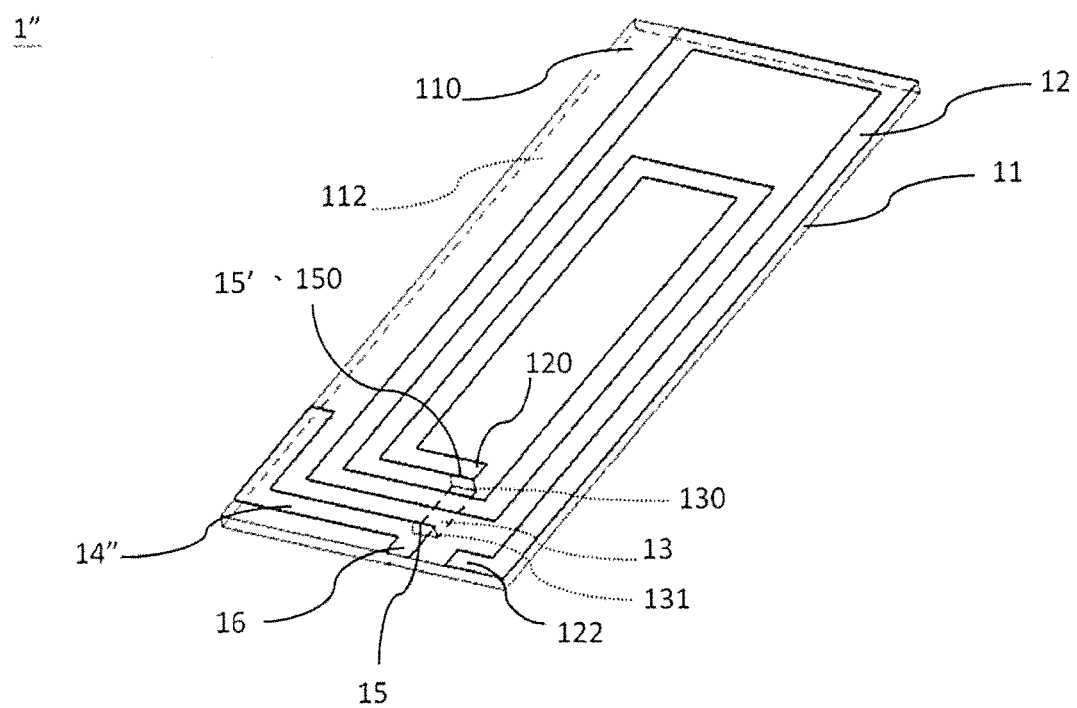
FIG. 4 is a top plane view of the wireless charging circuit of the third embodiment of the present invention.

Please refer to FIG. 4. FIG. 4 is a top plane view of the wireless charging circuit of the third embodiment of the present invention. As shown in FIG. 4, the structure of the wireless charging circuit 1" is similar to that of the wireless charging circuit 1. The wireless charging circuit 1" also includes a substrate 11, a first metal wire 12, a second metal wire 13 and a second extending portion 16. The major difference between the wireless charging circuit 1 and the wireless charging circuit 1" is that the first extending portion 14" of the second metal wire 13 is extended out through the first through hole 15 from the second end 131 and is located on the first surface 110. The second extending portion 16 is also extended out from the second end 131. Accordingly, the first extending portion 14" is partially parallel to the first metal wire 12. In this present embodiment, the length of first extending portion 14" is shorter than a half of that of first metal wire 12, and the distance between the first extending portion 14" and first metal wire 12 is not more than 5 mm.

Figure 1:
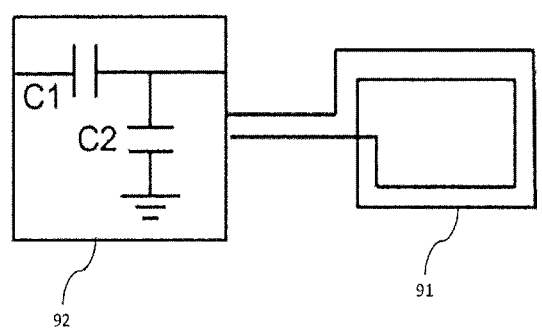
FIG. 1 is a schematic view of the conventional wireless charging circuit.
Figure 6:
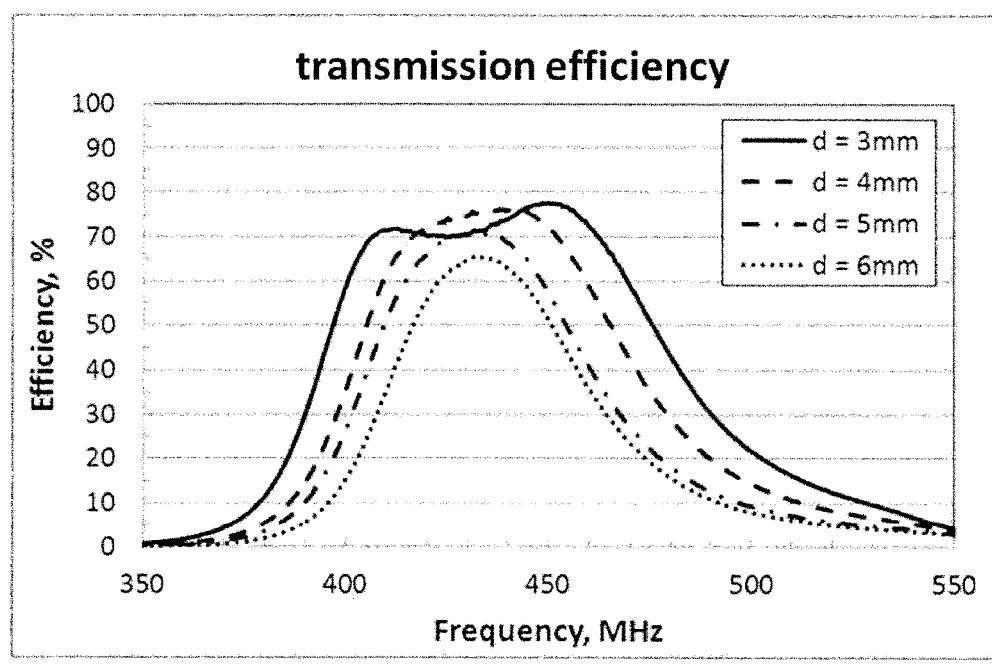
FIG. 6 is a schematic view of the relationship between the operating frequency and transmission efficiency when the different distances between the first extending portion of the second metal wire and the first metal wire.

In the present invention, the wireless charging circuits 1, 1', 1" are used to replace the coupling coil 91 of the conventional wireless charging system 9 as shown in FIG. 1. The first extending portion 14, 14', 14" can increase an equivalent parallel capacitance value for the wireless charging circuit 1, 1', 1". By changing the overlapping area (as previously described in the first and the second embodiment) or the distance between the first extending portion 14, 14', 14" and the first metal wire 12 (as previously described in the third embodiment), the equivalent parallel capacitance value of the coupling coil 91 can be adjusted. Specifically, when the length of first extending portion 14, 14' are increased to increase the overlapping area between the first extending portion 14, 14', 14" and first metal wire 12, or when the distance between the first extending portion 14" and the first metal wire 12 is shorten, the equivalent parallel capacitance value will be increased so as to the operation frequency of the wireless charging circuit 9 (as shown in FIG. 1) will be dropped. On the contrary, when the length of the first extending portion 14, 14' are shorten to reduce the overlapping area between the first extending portion 14, 14' and the first metal wire 12, or the distance between the first extending portion 14" and the first metal wire 12 is increased, the operation frequency of the wireless charging circuit 9 (as shown in FIG. 1) will be increased. Please refer to FIG. 6. FIG. 6 is a schematic view of the relationship between the operating frequency and transmission efficiency when the different distances between the first extending portion of the second metal wire and the first metal wire. As, shown in FIG. 6, when the transmission efficiency is at constant, the distance "d" between the first extending portion 14, 14', 14" of the second metal wire 13 and first metal wire 12 is to be shorten, so that the equivalent parallel capacitance value will be increased, and the operation frequency of the wireless charging system of the present invention is to be dropped. On the contrary, when the distance "d" between the first extending portion 14, 14', 14" of the second metal wire 13 and the first metal wire 12 is increased, the operation frequency of the wireless charging system of the present invention will be increased. It should be noted that the meaning of "fully overlapped" or "partially overlapped" is that the first extending portion 14 is not contacted to the first metal wire 12. That is, there is a distance between the first extending portion 14 and the first metal wire 12.

Figure 5:
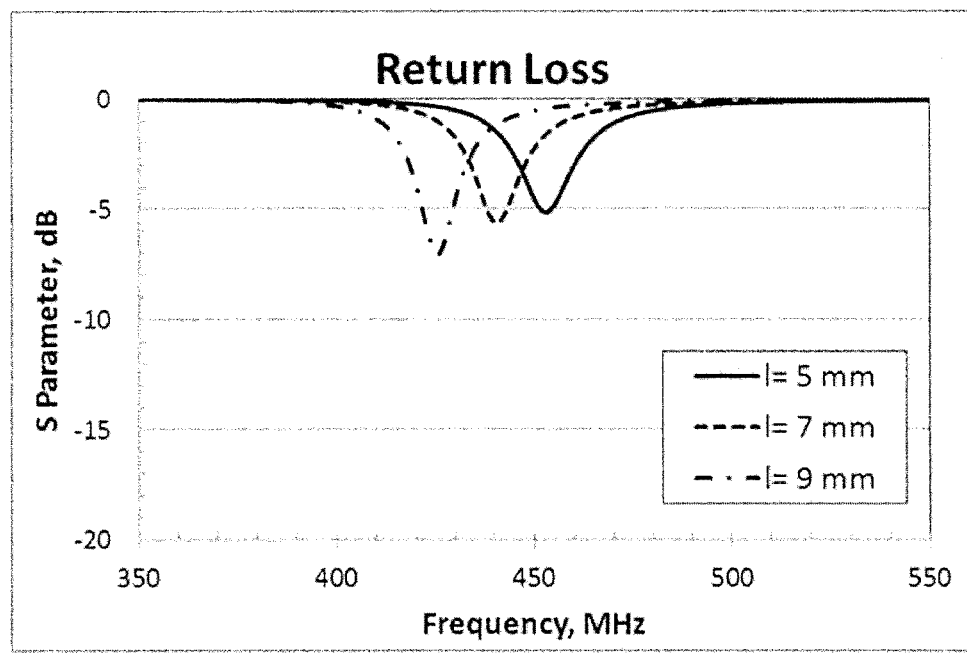
FIG. 5 is a diagram that shows the relationship between the operation frequency and the length of the first extending portion of the second metal wire of the present invention.

Please refer to FIG. 5. FIG. 5 is a schematic diagram that shows the relationship between the operation frequency and the length of the first extending portion of the second metal wire of the present invention. FIG. 5 shows the relationship between the operation frequency and the length of the first extending portion 14, 14', 14" and the wireless charging circuit 1, 1', 1". As shown in FIG. 5, the symbol "l" represents the length of the first extending portion 14, 14', 14". As the data shown in FIG. 5, when the length of the first extending portion 14, 14', 14" is 9 mm, the operation frequency is the lowest. When the scattering parameters "S" of the return loss in decibels (dB) are identical, by comparing the 9 mm length "l" of the first extending portion 14, 14', 14" and the shorter length (such as length is 5 mm or 7 mm) in FIG. 5, the operation frequency for 9 mm length of the first extending portion 14, 14', 14" is the lowest. Moreover, FIG. 5 also shows with changing the length of the first extending portion 14, 14', 14", the operation frequency of the wireless charging circuit 1, 1', 1" can be adjusted easily.

Accordingly, when the circuit complexity and the coupling coil volume are not increased, the wireless charging circuit of the present invention can achieve to change the operation frequency by adjusting the length of the metal wires.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A wireless charging circuit, comprising:
   a substrate, which includes a first surface and a second surface which is opposite to the first surface;
   a first metal wire which is spirally disposed on the first surface and includes a first end; and
   a second metal wire, which is disposed on the second surface, includes a second end and a first extending portion, wherein the second end is electrically connected to the first end, and the arrangement of first extending portion corresponds the first metal wire, wherein the length of the first extending portion of the second metal wire is shorter than a half of that of the first metal wire, and the distance between the first extending portion and the first metal wire which is corresponding to the first extending portion is not more than 5 mm.

2. The wireless charging circuit of claim 1, wherein the thickness of the substrate is not greater than 5 mm.

3. The wireless charging circuit of claim 1, wherein the second end of the second metal wire is electrically connected to the first end of the first metal wire through a first through hole of the substrate.

4. The wireless charging circuit of claim 3, wherein the second metal wire further comprises a second extending portion, and the second extending portion extends to the first surface through a second through hole of the substrate.

5. The wireless charging circuit of claim 1, wherein the arrangement of the first extending portion of the second mental wire fully overlap the first metal wire.

6. A wireless charging circuit, comprising:
   a substrate, which includes a first surface and a second surface which is opposite to the first surface;
   a first metal wire, which is spirally disposed on the first surface and includes a first end; and
   a second metal wire, which is disposed on the second surface, includes a second end and a first extending portion, wherein the second end is electrically connected to the first end, and the arrangement of the first extending portion partially overlaps with the first metal wire, wherein the length of the first extending portion of the second metal wire is shorter than a half of that of the first metal wire, and the distance between the first extending portion and the first metal wire which is corresponding to the first extending portion is not more than 5 mm.

7. The wireless charging circuit of claim 6, wherein the thickness of the substrate is not greater than 5 mm.

8. The wireless charging circuit of claim 6, wherein the second end of the second metal wire is electrically connected to the first end of the first metal wire through a first through hole of the substrate.

9. The wireless charging circuit of claim 8, wherein the second metal wire further comprises a second extending portion, and the second extending portion extends to the first surface through a second through hole of the substrate.

10. The wireless charging circuit of claim 6, wherein the first extending portion of the second metal wire is windingly disposed on the substrate.

11. A wireless charging circuit, which characterized by comprising:
    a substrate, which comprises a first through hole, a second through hole, a first surface and a second surface which is opposite to the first surface;
    a first metal wire, which is spirally disposed on the first surface, and includes a first end; and
    a second metal wire, which is disposed on the second surface, includes a second end and a first extending portion, wherein the second end of the second metal wire is electrically connected to the first end of the first metal wire through the first through hole, and the first extending portion of the second metal wire extends to the first surface through the second through hole, wherein the first extending portion does not contact with the first metal wire, wherein the length of the first extending portion of the second metal wire is shorter than a half of that of the first metal wire, and the distance between the first extending portion and the first metal wire which is corresponding to the first extending portion is not more than 5 mm.

12. The wireless charging circuit of claim 11, wherein the second metal wire further comprises a second extending portion, and the second extending portion extends to the first surface through the second through hole.

13. The wireless charging circuit of claim 11, wherein the arrangement of the first extending portion of the second metal wire is parallel to the first metal wire.

* * * * *